United States Patent
Rajamanickam et al.

(10) Patent No.: US 9,338,127 B2
(45) Date of Patent: May 10, 2016

(54) BROWSER BASED HOSTNAME RESOLUTION FOR NON-DNS (DOMAIN NAME SERVICE) AND/OR DIFFERENT DNS ENVIRONMENTS

(71) Applicant: International Business Machines Corporation, Armonk, NY (US)

(72) Inventors: Logeswaran T. Rajamanickam, Tirupur (IN); Rohit Shetty, Bangalore (IN)

(73) Assignee: International Business Machines Corparation, Armonk, NY (US)

( * ) Notice: Subject to any disclaimer, the term of this patent is extended or adjusted under 35 U.S.C. 154(b) by 0 days.

(21) Appl. No.: 14/023,859

(22) Filed: Sep. 11, 2013

(65) Prior Publication Data
US 2015/0074290 A1    Mar. 12, 2015

(51) Int. Cl.
*H04L 29/12* (2006.01)

(52) U.S. Cl.
CPC ........ *H04L 61/1511* (2013.01); *H04L 61/6009* (2013.01)

(58) Field of Classification Search
CPC .............. H04L 29/06; H04L 29/08072; H04L 29/08081; H04L 61/1511
USPC .................................................. 709/203, 249
See application file for complete search history.

(56) References Cited

U.S. PATENT DOCUMENTS

| | | | |
|---|---|---|---|
| 6,332,158 B1 * | 12/2001 | Risley et al. .................. | 709/219 |
| 7,725,602 B2 | 5/2010 | Liu et al. | |
| 8,364,785 B2 | 1/2013 | Plamondon | |
| 8,417,824 B2 | 4/2013 | Raciborski et al. | |
| 2002/0138649 A1 * | 9/2002 | Cartmell et al. .............. | 709/245 |
| 2003/0149746 A1 * | 8/2003 | Baldwin et al. ............... | 709/219 |
| 2006/0271641 A1 * | 11/2006 | Stavrakos et al. ............. | 709/217 |
| 2010/0161799 A1 * | 6/2010 | Maloo ............... H04L 29/12066 709/226 |  |
| 2010/0274970 A1 | 10/2010 | Treuhaft et al. | |
| 2011/0078292 A1 | 3/2011 | Ananda et al. | |
| 2011/0145316 A1 * | 6/2011 | Ait-Ameur et al. .......... | 709/203 |

(Continued)

FOREIGN PATENT DOCUMENTS

| | | | |
|---|---|---|---|
| EP | 1303108 B1 | 6/2010 | |
| EP | 2426894 A1 * | 3/2012 | ........ H04L 29/12066 |

OTHER PUBLICATIONS

Configuring the IBM Tivoli Monitoring REST service on Windows systems, IBM Knowledge Center, 1 page.*

(Continued)

*Primary Examiner* — Brendan Higa
*Assistant Examiner* — Leon Y Tseng
(74) *Attorney, Agent, or Firm* — David B. Woycechowsky; William H. Hartwell (57) ABSTRACT

Communication between (at least) two domains where domain name resolution for the first domain is not going to be available to clients in the second domain "as a service" but more as a "capability" available inherently in web containers. This can be accomplished as follows: (i) connecting a first server computer in direct data communication with a first domain and a second domain; (ii) storing domain name system (DNS) mapping information for the second domain on the first server computer; (iii) storing a first network page related to a network application on the first server computer; and (iv) sending, from the first server computer to a client computer on the first domain, the first network page and the DNS mapping information for the second domain.

20 Claims, 6 Drawing Sheets

(56) References Cited

U.S. PATENT DOCUMENTS

| | | | |
|---|---|---|---|
| 2011/0153867 A1* | 6/2011 | van de Ven et al. | 709/245 |
| 2013/0232508 A1* | 9/2013 | Allen et al. | 719/318 |
| 2014/0173134 A1* | 6/2014 | Choquette et al. | 709/245 |

OTHER PUBLICATIONS

Tivoli Monitoring Release Information Version 6.3, Apr. 4, 2013, IBM developerWorks, 13 pages.*

The first release of IBM Tivoli Analytics for Service Performance (TASP) is now available, Feb. 5, 2013, IBM developerWorks, 2 pages.*

Install and configure Tivoli Common Reporting Cognos-based reports within IBM Tivoli Monitoring v6, Sep. 2010, IBM, 42 pages.*

Anderson, B., "Why Web Browser DNS Caching Can Be a Bad Thing", Sep. 7, 2011, pp. 1-3.

"DNS Name Resolution Process", The TCP/IP Guide, Version 3.0—Version Date: Sep. 20, 2005, Copyright 2001-2005 Charles M. Kozierok.

"HTTP/1.1:Protocol Parameters", part of Hypertext Transfer Protocol—HTTP/1.1, RFC 2616 Fielding, et al., Jun. 1999, <http://www.w3.org/Protocols/rfc2616/rfc2616-sec3.html>.

"Jaya HTTP Connection Filed -> It's a DNS problem", On Java Studio >> Java Programming, publish: Mon, Sep. 24, 2007, <http://java-program.developerfaqs.com/q_java-programming_161554.html>.

Wisniewski, Thomas, "Java Tip 37: The trick to using Java networking applets behind firewalls", JavaWorld.com, Aug. 1, 1997, <http://www.javaworld.com/javaworld/javatips/jw-javatip37.html>.

"Open Services for Lifecycle Collaboration", Wikipedia, the free encyclopedia, page last modified on Jul. 18, 2013 at 00:31, <http://en.wikipedia.org/w/index.php?title=Open_Services_for_Lifecycle_Collaboration&oldid=564722240>.

"Representational state transfer", Wikipedia, the free encyclopedia, page last modified on Jul. 25, 2013 at 00:47, <http://en.wikipedia.org/w/index.php?title=Representational_state_transfer&oldid=565686632>.

"Software as a service", Wikipedia, the free encyclopedia, page last modified on Jun. 21, 2013 at 05:31, <http://en.wikipedia.org/wiki/Software_as_a_service>.

\* cited by examiner

BROWSER BASED HOSTNAME RESOLUTION FOR NON-DNS (DOMAIN NAME SERVICE) AND/OR DIFFERENT DNS ENVIRONMENTS

FIELD OF THE INVENTION

The present invention relates generally to the field of computer network communications that use domain name service (DNS), and more particularly to network applications that utilize multiple servers having various internet protocol (IP) addresses and associated mappings.

BACKGROUND OF THE INVENTION

Representational state transfer (REST) is a style of software architecture for distributed systems where software runs on various networked computers connected in data communication. REST is a web API (application programming interface) design model. REST-style architectures conventionally include clients and servers. Clients initiate requests to servers; servers process requests and return appropriate responses. Requests and responses are built around the transfer of representations of resources (that is, any coherent and meaningful concept that may be addressed). A representation of a resource is a document that captures the current, or intended state, of a resource. The client sends requests when it is ready to make the transition to a new state. While one or more requests are pending, the client is in "transition." The representation of each application state includes links that are to be used the next time the client chooses to initiate a new state-transition.

Open Service for Lifecycle Collaboration (OSLC) is a set of specifications that enable integration of software development and more broadly Application Lifecycle Management (ALM) and Product Lifecycle Management (PLM) products and services. The OSLC specifications: (i) build on the W3C Resource Description Framework (RDF), Linked Data and REST; (ii) enable integration at data level via links between related resources. OSLC resources are defined in terms of RDF properties. Operations on resources are performed using HTTP. OSLC includes specifications directed to user interface techniques for previewing, creating and selecting links.

Applications and services that are deployed in a clustered environment use service/virtual IP's (Internet Protocols) and virtual hostnames. This allows the applications to be configured with a single address, while being deployed and/or hosted on multiple machines. When applications are configured to use virtual hostnames, there will be situations where these hostnames will be used for accessing various resources. Connectivity may fail due to the unavailability of mapping between the hostname and the IP address. When this happens to the UI (User Interface) component, and the UI component is a web based application like RESTful, (Representational State Transfer) or a Java Applet, or a Dojo widget, or a remote client, it will generally create problems, because the virtual hostnames might not be connected to an IP address at the client where the UI is running. (Note: the term(s) "JAVA" and/or "DOJO" may be subject to trademark rights in various jurisdictions throughout the world and are used here only in reference to the products or services properly denominated by the marks to the extent that such trademark rights may exist.) The same issue is present in OSLC (Open Service for Lifecycle Collaboration) and Linked Data applications, where multiple Service Providers can be registered, each of them comes from its own domain, and is being accessed by multiple applications through URLs.

Furthermore, RESTful applications use HTTP (Hypertext Transfer Protocol) requests for the operations, like create, delete, view and update data. Deployment of RESTful applications in a non-DNS environment potentially aggravates the DNS mapping problem.

A domain is a set of networked computers (see definition, below) that share a common address scheme. The World Wide Web is an example of one (quite large) domain, which uses internet protocol (IP) as a protocol for its address scheme. Many smaller domains (such as local area networks (LANs) and wide area networks (WANs) are connected to the World Wide Web.

A router is a device that communicates data packets between computer domains (such as a LAN, a WAN or the World Wide Web). A router is connected to two or more data lines from different domains. When a data packet comes in from the first domain to the router (by using a first domain IP address associated with the second domain taken as a whole), the router reads second domain destination information in the incoming packet to determine an address (usually an IP address) that the appropriate destination device has been assigned in the second domain. The router then forwards the packet through the second domain using the second domain address. While a router may be a limited purpose stand-alone device, router capabilities may also be built and/or programmed into a computer having other purposes, such as a server computer.

SUMMARY

According to an aspect of the present invention, a method includes the following steps (not necessarily in the following order): (i) connecting a first server computer in direct data communication with a first domain and a second domain; (ii) storing domain name system (DNS) mapping information for the second domain on the first server computer; (iii) storing a first network page related to a network application on the first server computer; and (iv) sending, from the first server computer to a client computer on the first domain, the first network page and the DNS mapping information for the second domain.

DETAILED DESCRIPTION

This Detailed Description section is divided into the following sub-sections: (i) The Hardware and Software Environment; (ii) First Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
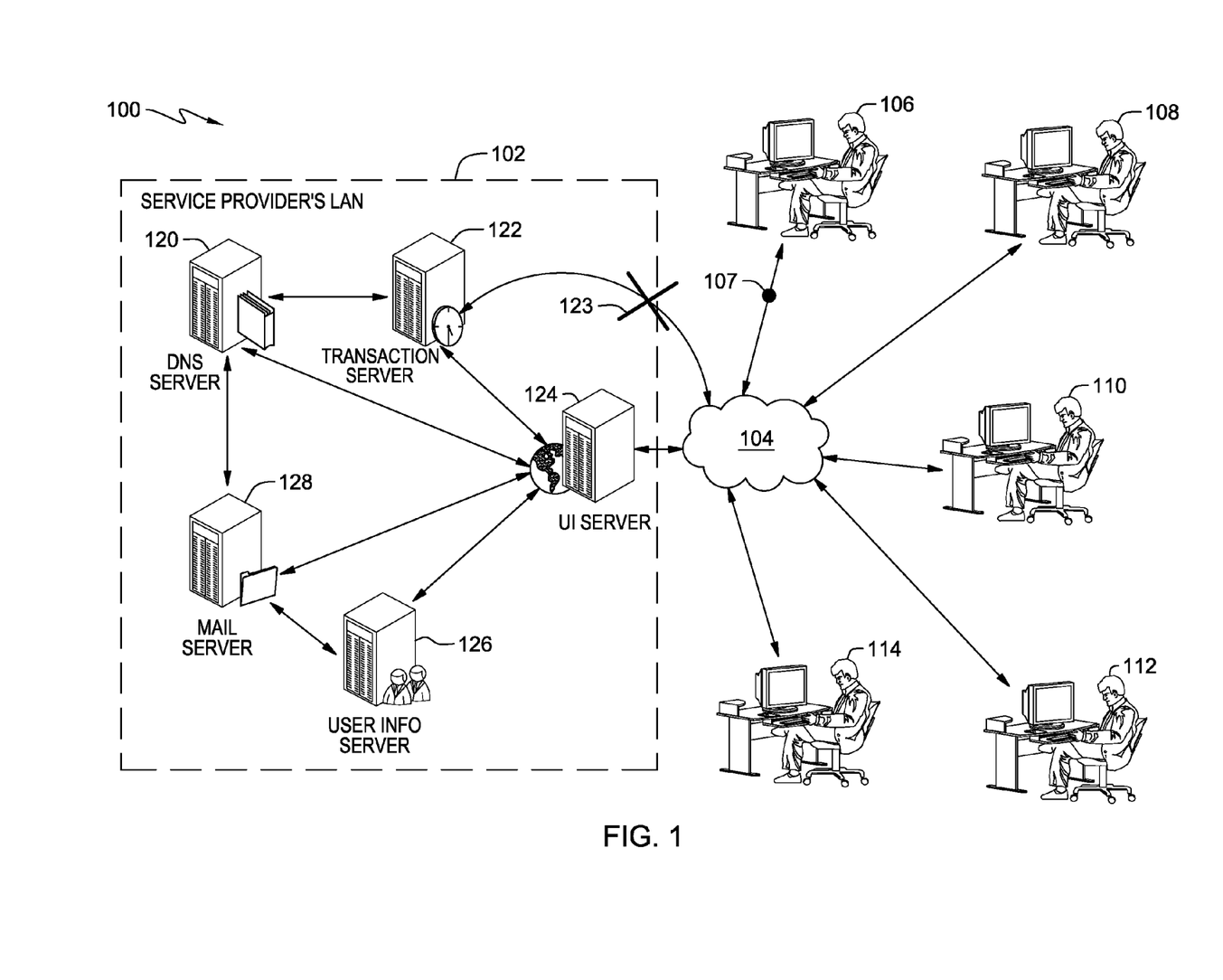
FIG. 1 is a schematic view of a first embodiment of a networked computer system according to the present invention.
Figure 2:
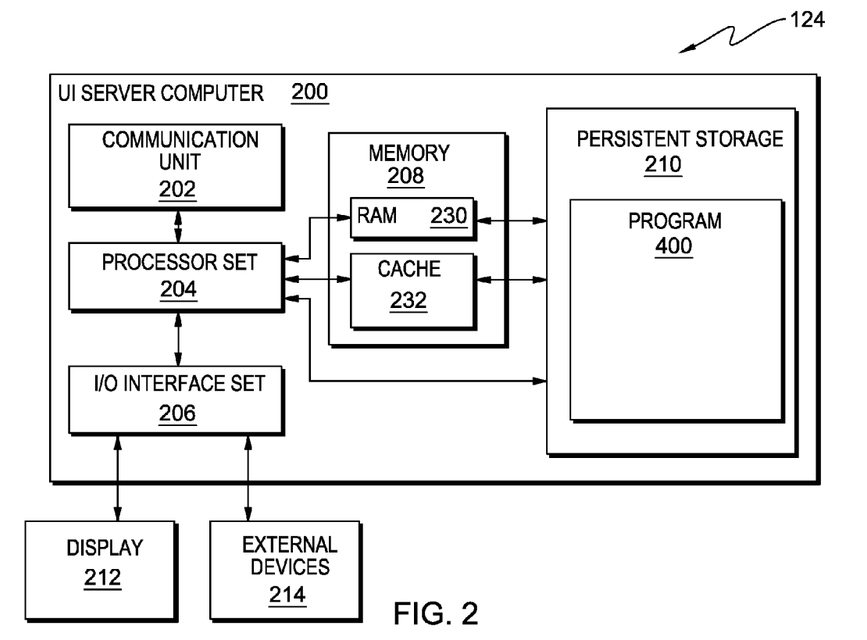
FIG. 2 is a schematic view of a UI Server computer subsystem portion of the first embodiment system.

An embodiment of a possible hardware and software environment for software and/or methods according to the present invention will now be described in detail with reference to the Figures. FIGS. 1 and 2 collectively make up a functional block diagram illustrating various portions of distributed data processing system 100, including: Service Provider's LAN (Local Area Network) 102 (which includes DNS Server 120, Transaction Server 122, unavailable data path 123, UI Server sub-system 124, User Info Server 126, and Mail Server 128); communication network 104; client sub-systems 106, 108, 110, 112, 114; communication line 107; UI Server computer 200 (which includes communication unit 202, processor set 204, input/output (i/o) interface set 206, memory device 208, persistent storage device 210, random access memory (RAM) devices 230, cache memory device 232, and program 400); display device 212; and external device set 214.

As shown in FIG. 2, UI Server sub-system 124 is, in many respects, representative of the various computer sub-system(s) in the present invention. Accordingly, several portions of sub-system 124 will now be discussed in the following paragraphs.

UI Server sub-system 124 may be a laptop computer, tablet computer, netbook computer, personal computer (PC), a desktop computer, a personal digital assistant (PDA), a smart phone, or any programmable electronic device capable of communicating with the client sub-systems via network 104. Program 400 is a collection of machine readable instructions and/or data that is used to create, manage and control certain software functions that will be discussed in detail, below, in the First Embodiment(s) sub-section of this Detailed Description section.

Sub-system 124 is capable of communicating with other computer sub-systems via network 104 (see FIG. 1). Network 104 can be, for example, a local area network (LAN), a wide area network (WAN) such as the Internet, or a combination of the two, and can include wired, wireless, or fiber optic connections. In general, network 104 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, sub-system 124 is shown as a block diagram with many double arrows. These double arrows (no separate reference numerals) represent a communications fabric, which provides communications between various components of sub-system 124. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 124; and/or (ii) devices external to sub-system 124 may be able to provide memory for sub-system 124.

Program 400 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 400 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 124, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with UI server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 400, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

In system 100, a first domain is made up of LAN 102 (considered as a single destination); network 104 and client sub-systems 106, 108, 110, 112, 114. In this example, this first domain is the World Wide Web. LAN 102 (considered as a set of separate destinations respectively corresponding to the computers within LAN 102) is a second domain. UI Server 124, in addition to having certain data serving functions, as will be discussed below, also acts as a router for communications between computers in the first domain and computers in the second domain. DNS Server 120 provides domain name system services for the second domain. Although not shown in FIG. 1, there are other computers that provide domain name system services for the first domain, as is conventional for the World Wide Web.

II. First Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
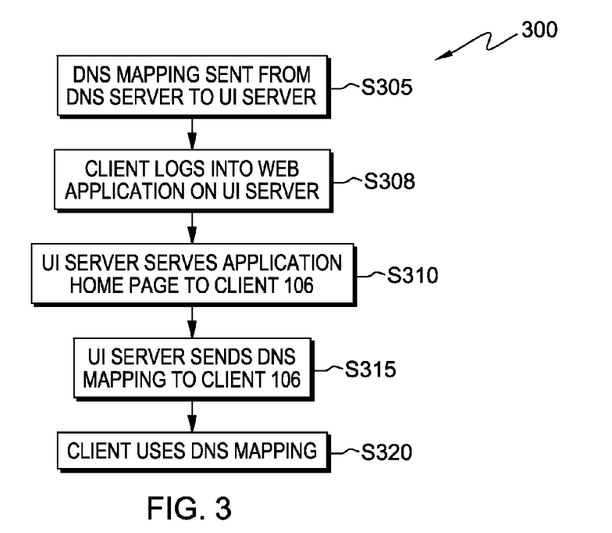
FIG. 3 is a flowchart showing a process performed, at least in part, by the first embodiment system.
Figure 4:
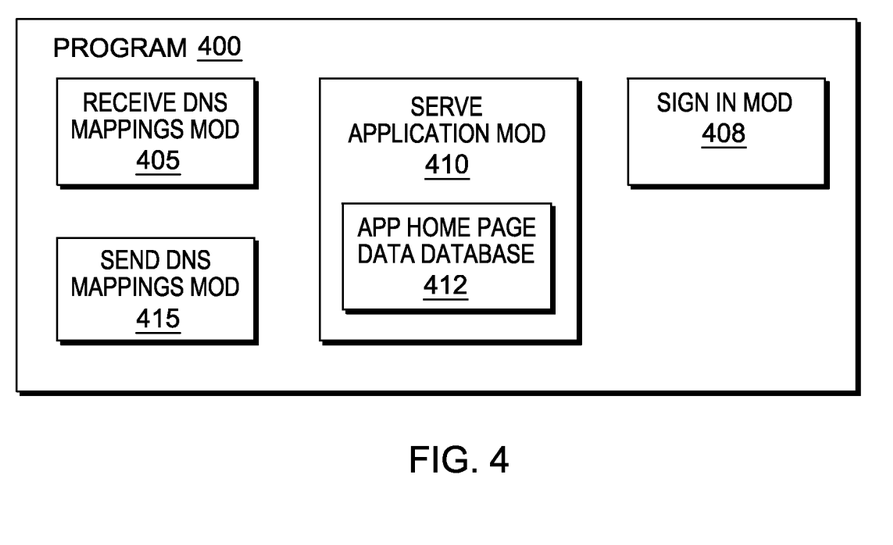
FIG. 4 is a block diagram view of a portion of the first embodiment system.

FIG. 3 shows a flow chart 300 depicting a method according to the present invention. FIG. 4 shows program 400 for performing at least some of the method steps of flow chart 300. This method and associated software will now be discussed, over the course of the following paragraphs, with extensive reference to FIG. 3 (for the method step blocks) and FIG. 4 (for the software blocks).

Processing begins at step S305, where receive DNS mappings module (or "mod") 405 of program 400 of UI Server 124 (see FIGS. 1 and 4) receives DNS mapping information sent from DNS Server 120 via Transaction Server 122. This DNS mapping information includes all DNS mapping information that a client would need when using a web based application hosted on the various computers of LAN 102 (see FIG. 1). The DNS entries or /etc/hosts entries can be updated or refreshed at any frequency, irrespective of the update frequency the UI server would pick up the latest mapping when it receives a request to render the UI Server. For example, on every request, DNS mapping information might be picked up from a cache, and there are mechanisms of providing appropriate synchronization. Alternatively, in some embodiments, there is no DNS server (that is, all host mapping is done using local/etc/hosts mapping).

Processing proceeds to step S308, where client sub-system 106 logs onto a web application administered by sign in mod 408 of program 400 of UI Server 124 (see FIGS. 1 and 4). More specifically, client sub-system 106 communicates with administrator web app 408 through communication path 107 and network 104, so that the client authenticates her identity (for example, by entering a password) to sign into the web application. This web application will be served by the various machines of LAN 102, which means that client sub-system 106 will need a DNS mapping in order to communicate with the various machines within LAN 102. However, communication path 123 is blocked, or otherwise not operative, so that Transaction Server 122 and DNS Server 120 are not available for communication with client sub-system 106. In conventional systems, DNS Server 120 would provide this DNS mapping to clients like client sub-system 106. In this embodiment of the present invention, however, client sub-system 106 cannot receive the DNS mapping in the conventional way because of blocked communication path 123.

Processing proceeds to step S310, where serve application module ("mod") 410 sends application home page data from application homepage data database 412 to client sub-system 106. The data of this homepage contains links to resources on other server computers within LAN 102. These links require that client sub-system 106 will have DNS mapping information so that URL (uniform resource locator) data corresponding to the various server computers of LAN 102 can be translated in a numerical IP address for that server computer. At step S310, the web application homepage, received from mod 412 of program 400 of UI Server 124, is displayed for the client at client sub-system 106.

Processing proceeds to step S315, where send DNS mappings mod 415 send DNS mapping information to client sub-system 106. Alternatively (and as will be further discussed below in the next sub-section of this detailed description section), the DNS mapping information could be sent along with the web application home page data at step S310. Either way, by sending the DNS mapping information from UI Server 124 to a client sub-system, this avoids the need to have a "DNS Server" available for access by the various client sub-systems. The DNS mapping is communicated for the purpose of clients being able to resolve the host name information in the application to the IP addresses, and not merely for the purpose of sharing the IP addresses. In this embodiment, the DNS mapping information is communicated so that the user is able to access the different applications/components that are deployed on different servers in environments where DNS resolution does not work (different disconnected DNS's).

By sending the DNS mapping information from UI Server 124 to the clients, blocked line 123 (that is, potential unavailability of the DNS Server) is removed as a potential problem. This is potentially advantageous because blocked line 123 may be a situation out of effective control of the web application entity that owns and controls LAN 102. On the other hand, in this embodiment of the present disclosure, the DNS mapping information is delivered in a reliable fashion to the clients because: (i) DNS mapping information can be reliably delivered to UI Server 124 from DNS Server 122 within the LAN (and, specifically through Transaction Server 122 within the LAN); (ii) if a client is in communication with the UI Server 124 in order to get the application's homepage, then it is likely that the DNS mapping information can be delivered over this same communication path (especially in embodiments where the DNS mapping information is included in the same data packets as the data for displaying the application's home page itself). This reliability can be especially helpful with the UI today, where the web application's "dashboard" essentially makes direct REST/Web calls to the underlying components (that is, the transaction server, etc.) This means that when a client brings up the UI on her browser at the client side, her browser will have to resolve the hostname of the transaction server so that the REST call can go through. This requires the client DNS to have a hostname mapping for this host, which cannot happen because this hostname is not in the client's domain and is outside the preview of their DNS (that is, there is no shared DNS).

Processing proceeds to step S320, where the client uses the DNS mapping information in order to follow the links on the web application home page and thereby access the other server computers on the LAN in order to use the various types of functionality provided by the web application. This DNS mapping information is DNS mapping information for the second domain. Using DNS mapping information for the second domain, clients using the web application can more reliably use all parts of the web application, even parts that require communication with second domain computers other than UI Server 124 (which acts as the router for the second domain with respect to the first domain).

III. Further Comments and/or Embodiments

Method flow and an associated system, according to an embodiment of the present invention, will now be discussed. This embodiment provides the browsers with the hostname resolution capabilities similar to the operating system. Whenever the application accesses other servers, the server collects its HOSTS file entries, related DNS mappings and/or configured DNS mappings. This data can be sent as a part of the response from the application to the client. When the response reaches the client-side browser, the mapping data gets cached for the session based on the security policies.

When a new request is generated (that is, different URL/applications being accessed from that page) the cached DNS mapping data gets used for IP resolution. If the hostname still remains unresolved, then it can look into the HOSTS file entries or the DNS data from the client machine.

The method of this embodiment ensures that the IP address corresponding to the new server is known to the client and hence the service is always accessible. This resolved IP address is used for the entire session to access the application. The browser maintains the repository, in such a way, that the HOSTS get resolved based on the sessions established with the servers or the domain, or based on the browser window. In this way, the host from one domain will not affect web applications from another domain and session integrity ensures transactional security.

Figure 5:
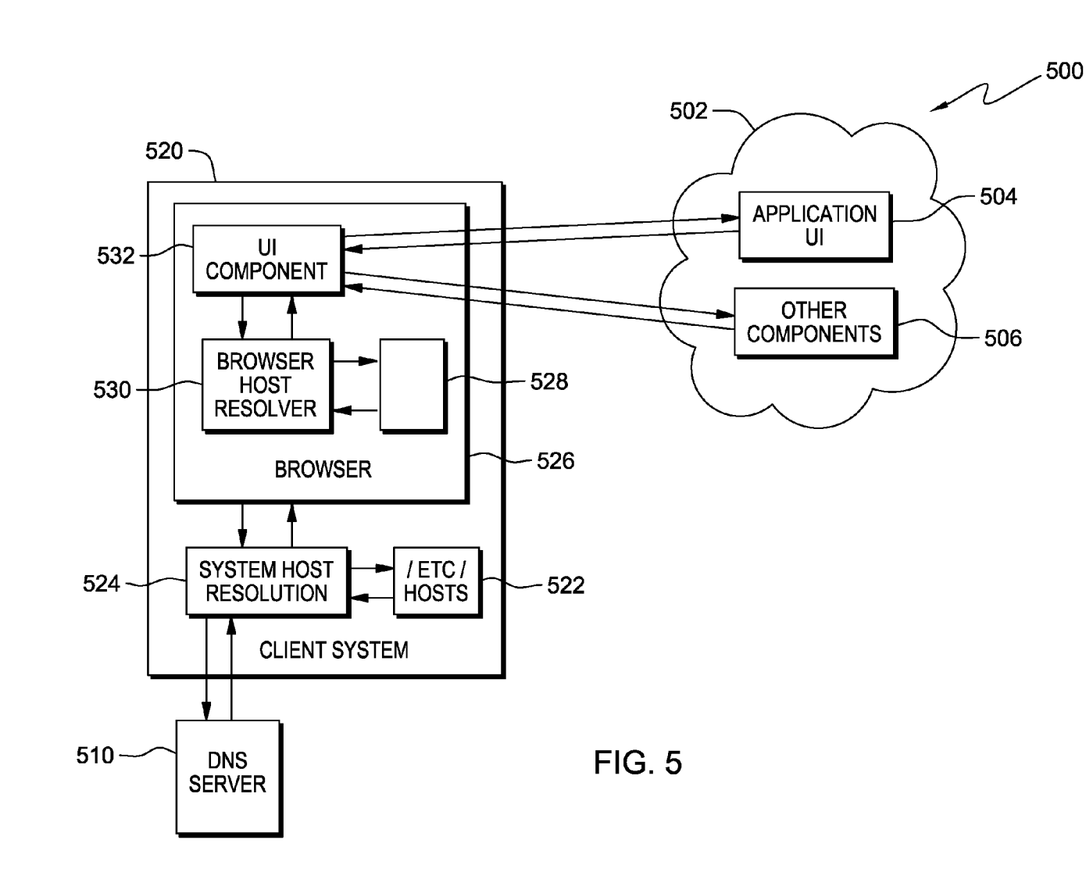
FIG. 5 is a schematic view of a portion of a second embodiment networked computers system.

As shown in FIG. 5, networked computer system 500 includes: cloud 502; application UI server 504; other components 506; DNS server 510; and client system 520. Client system 520 includes: host data store 522; system host resolution 524; and browser 526. Browser 526 includes: UI component 532; browser host resolve 530; and resolver data store 528.

In operation: (i) browser 526 accesses application UI server 504; (ii) browser 526 receives a response along with DNS mapping information (not separately shown) from the application UI server 124; (iii) the browser stores this DNS mapping information in resolver data store 528 through browser host resolver 530 for use in the current session; (iv) when a new request is generated to access the other components, either (a) the DNS mapping information that is present for this session in the browser gets used, or (b) if the hostname resolution is not present, then system host resolution 524 gets used; (v) if the system host resolution does not have IP Mapping, then the client's DNS information, provided by DNS server 510, gets used; and (vi) the DNS mapping information received from the server provides IP resolution for accessing the other components 506.

An example algorithm for the server side, in responding to a client's request, is as follows: (i) web server receives the request from client browser; (ii) the server processes the request and frames the response with the response header and the response data; and (iii) the response data and response header is combined together and gets transferred to the client-side browser. With respect to step (ii) of the algorithm, the response header will contain additional information about "DNS Mapping" for the links present in the response. "DNS Mapping" is collected from the HOSTS file or from the server side DNS.

Figure 6:
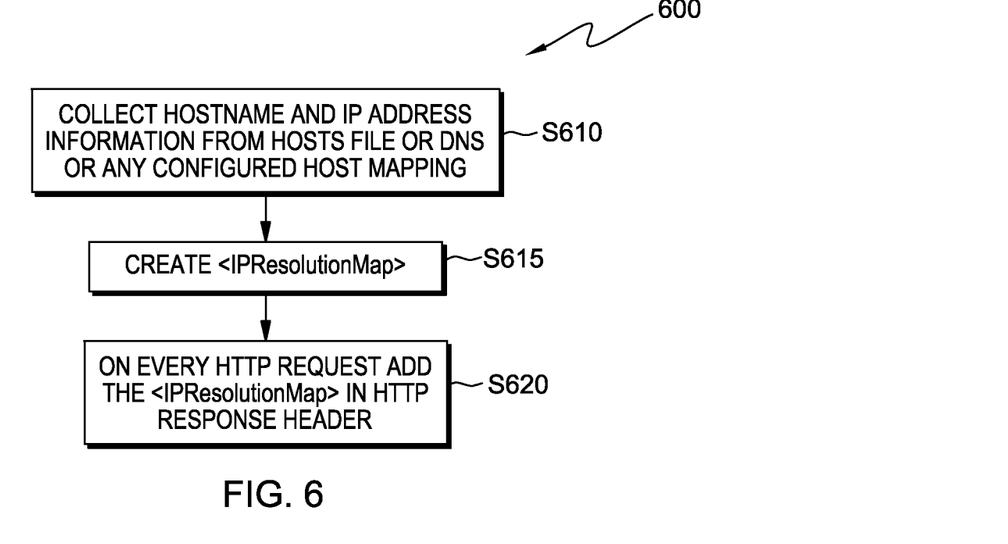
FIG. 6 is a flowchart showing a process performed, at least in part, by the second embodiment system.

As shown in FIG. 6, method 600 shows how a WebServer (not shown in FIG. 6) collects DNS mapping information and then provides the same to a client. Method 600 includes steps S610, S615 and S620 with process flow as shown in FIG. 6. An example <IPResolutionMap>, of the type created at step S615 follows:

| IP Address | Mapped-To URL |
|---|---|
| 9.124.100.29 | transaction.company.com |
| 9.124.100.32 | tstdirectorypages.india.company.com |
| 9.124.100.40 | nco10040.india.company.com |
| 9.124.100.45 | nco10045.india.company.com |

Figure 7:
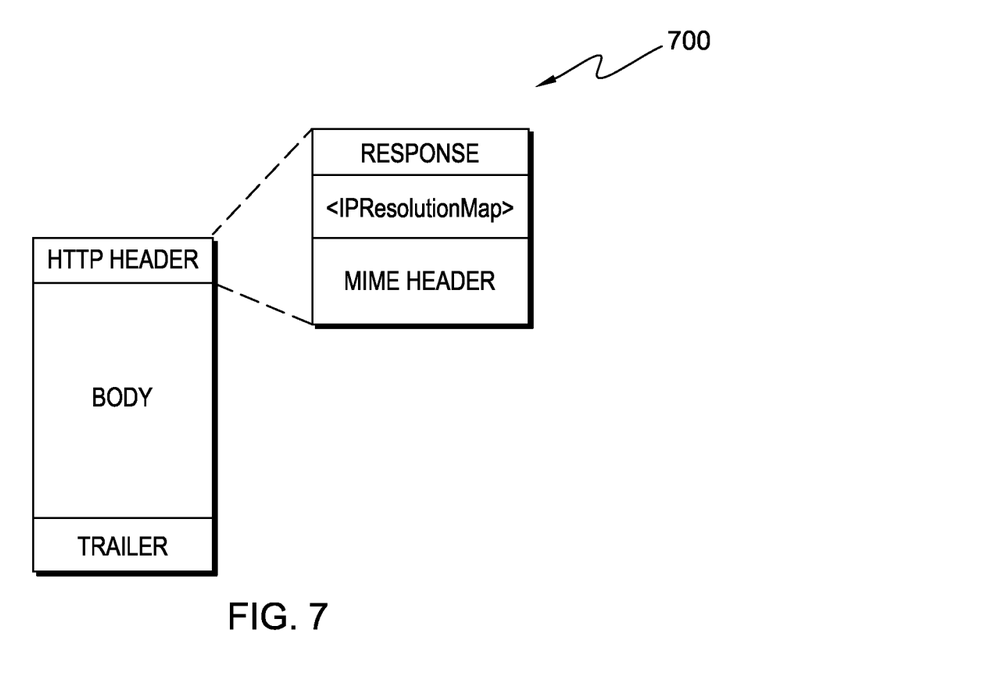
FIG. 7 is a data structure used by the second embodiment system.

Note that <IPResolution Map> provides IP addresses, uniform resource locators (that is, URLs for hosts, also known as hostnames) and the correlation between the IP addresses and the hostnames. As shown in diagram 700 of FIG. 7, when the server sends the client a response at step S620, in this embodiment, the <IPResolutionMap> is included as an item within the HTTP header.

Figure 8:
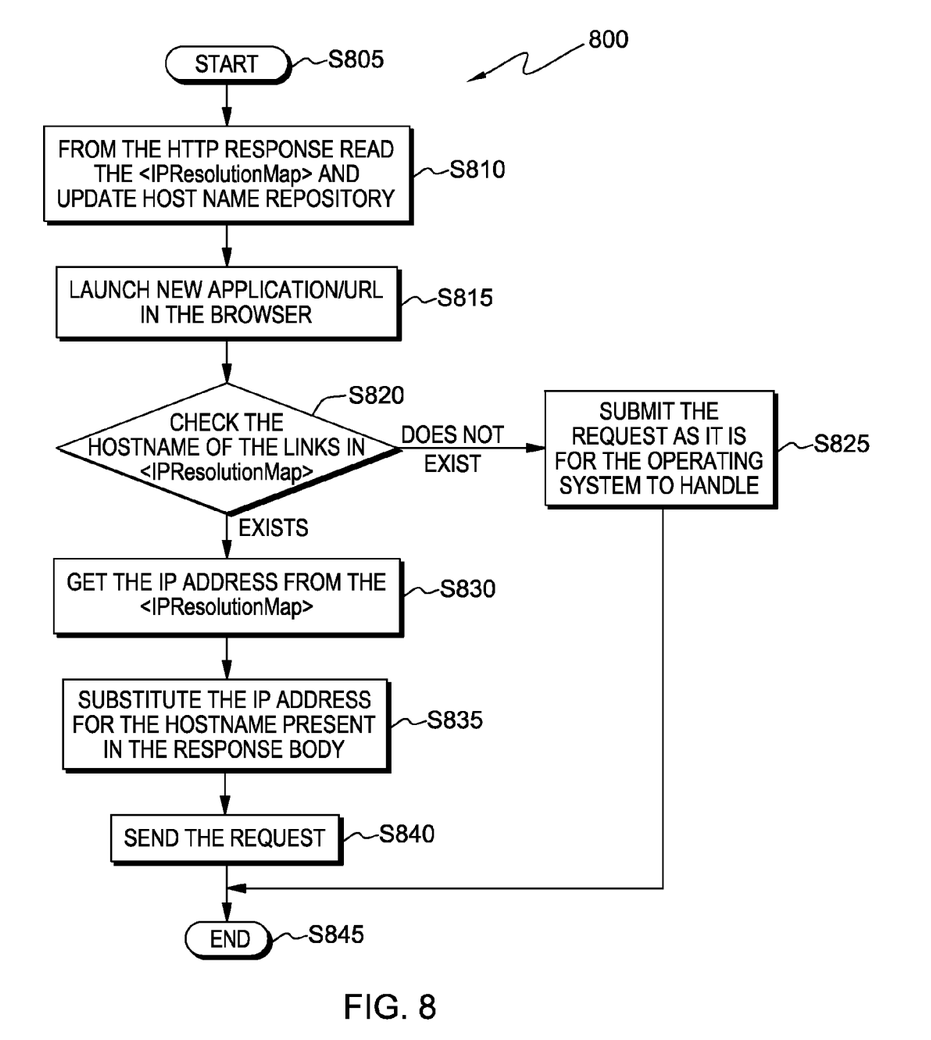
FIG. 8 is a flowchart showing a process performed, at least in part, by the second embodiment system.

As shown in FIG. 8, method 800 is an algorithm for client-side host resolution as follows: (i) the client-side browser sends request to the server (this occurs prior to S805); (ii) on receiving the response from the server, the browser stores the "DNS Mapping information" from the response header in the hostname repository (steps S805, S810 and S815); (iii) when another application or application-related URL is accessed from the response, the browser contacts the hostname repository for the specified application (based on the session, domain or browser session/window) to resolve the IP address (step S820); (iv) if the hostname is resolved, then the browser returns the resolved IP address to the web component that placed the request (steps S830, S835, S840 and S845); (v) if the hostname is not resolved, the browser delegates the request to the operating system and returns the status with the operating system response (steps S825 and S845).

System flow will now be discussed. The browser host repository would be updated with the hostname resolution information when the browser establishes connection with the web application. In one embodiment, the HTTP protocol can be used to send the mapping information between the hostnames and the IP addresses to the web browser. The web browser can then add this to the hostname repository that it is carrying for that session/window/domain, to ensure that any hostname resolution requests from this application would use this for resolution. The Web server can retrieve this mapping from its local host configuration (/etc/hosts) or can use the value configured by the Web Administrator/developer for the target Web Application (Web.xml) and/or use a mix of both. In this way, when the web application is deployed on the web server, the developer/administrator can also configure what the other domain/systems that are using the code from this server, will access, either running on that machine or from a remote client machine.

A first scenario according to an embodiment of the present invention will now be described. This scenario relates to a monitoring solution using integrated management services software. This embodiment deals with a typical problem seen in integrated services management software monitoring as will now be described. In this case, the portal service and the enterprise management server of the integrated management services software are installed on different systems. When a client browser connects to the portal server, the applet is what the user (that is, the client's browser) "sees". The applet internally makes requests to the enterprise management server machine. Now, if the client's browser, the portal server machine and the enterprise management server machine are not in the same network, the clients will not be able to resolve the IP address of the enterprise management server machine, so the only solution would be to manually make a file entry in the "hosts" sub-directory of the "etc" directory of each and every client (which could be a very big number and could be impractical) or make the DNS entries in the client network for the IP addresses/hostnames that will be contacted. In this "first scenario" embodiment, when the client connects to the portal server, the portal server machine can publish the host to IP mapping. In this way, the client now has all the required IP configurations available locally and this seamlessly solves the problem set forth, above, in this paragraph.

A second scenario according to an embodiment of the present invention will now be described. This scenario relates to distributed log analytics. In this "second scenario" embodiment, an attempt is made to setup a Hadoop (High-availability distributed object-oriented platform), and ElasticSearch, based log analytics environment in High Availability mode on a cloud infrastructure. The analytics reports/graphs are created using Dojo widgets, that connect to the Hadoop cluster to get the events using the cluster name (that is, Cluster name points to the active Hadoop server). These Dojo widgets are deployed in the TIP server. The TIP server can be accessed from any browser in the same server machine and will drill down into the analytics reports/graphs to see specific events. In this second scenario embodiment, an attempt can be made to connect from a laptop located in a network remote from the network where Hadoop resides. In this case, the TIP server can be accessed, but when an attempt is made to drill down to the analytic reports/graphs, errors with the Dojo call to Hadoop cluster can potentially cause a failure because of the hostname resolution problem. Thus, in the second scenario embodiment, a local machines host file (specifically, "C:\WINDOWS\system32\drivers\etc\hosts") is updated with the analytics cluster servers IP address mapping details. The problem experienced is that the Dojo widgets talk directly to ElasticSearch cluster elements using the RESTful interfaces that ElasticSearch provides. These RESTful URL's essentially end up using the local IP address, which is not recognized in the client (laptop) environment, because it does not have a shared DNS.

A third scenario according to an embodiment of the present invention will now be described. This scenario relates to Jazz for Service Management Registry services and OSLC. In this "third scenario" embodiment, each Service Provider registers the URL's for creation, view or delegated UI for the resources that it manages. These URL's could, and in most cases, will be delegates that are provided by the Service Providers for those resources, that is, the Monitoring Service Provider (ITM) will register linked data (for example, to a Computer-System). This may be the same machine that is running remotely. These URL's will point to the IP address of the remote server, since the data/service provider is running remotely. Now, when one visualizes the data in a browser, using Dojo widgets that query or delegate the requests to the URIs (Uniform Resource Identifier) located in the resource registry, it will fail since the DNS will not recognize the IP address hosting the service providers, or the delegates. The end user will have to update the DNS mapping in his local host to avoid this scenario.

Some embodiments of the present disclosure may include one, or more, of the following features, characteristics and/or advantages: (i) every end user system does not have a requirement to update the local host mapping configurations with the host mapping information based on type of services needed; (ii) in the OSLC and Linked Data environment, previews, delegate dialog, and selection dialog can be invoked from different service providers directly, without knowing the configuration information of each service host; and/or (iii) the browser manages the DNS mapping for the current session so any Web Service or RESTful application can interact with other Web Services and/or RESTful applications without any issues. Some embodiments of the present disclosure may include one, or more, of the following features, characteristics and/or advantages: (i) a method and system to identify related host mapping for an application based on other hostnames that might have to be accessed by a consumer; (ii) a method and system to send the above mentioned host mapping to the client browser using HTTP headers or other mechanisms; (iii) a method and system to collect and cache the host mapping information and use it for DNS resolution; (iv) a method and system for isolating the above mentioned host mapping information by session or security policies for secure access; (v) sending the host mapping to the client browser using HTTP headers or other mechanisms; (vi) DNS resolution based on the above mentioned host mapping information from HTTP headers; (vii) isolating the above mentioned host mapping information by session or security policies for secure access; and/or (viii) Domain Name Resolution is not created as a service. In some embodiments, the domain name resolution is not going to be available "as a service" but more as a "capability" available inherently in web containers.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Software storage device: any device (or set of devices) capable of storing computer code in a manner less transient than a signal in transit; "software storage device" does not include: any device that stores computer code only as a signal; and/or a signal propagation media, such as a copper cable, optical fiber or wireless transmission media.

Tangible medium software storage device: any software storage device (see Definition, above) that stores the computer code in and/or on a tangible medium.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Network page: Includes web pages, but not necessarily limited to "pages" that are delivered through the World Wide Web.

Network application: Includes web applications, but not necessarily limited to applications that are delivered through the World Wide Web.

What is claimed is:
1. A method comprising:
connecting a first server computer in direct data communication with a first domain and a second domain;
storing, on the first server computer, a first network page related to a network application;
receiving, from a second domain computer in the second domain, domain name system (DNS) mapping information for a set of resources in the second domain, where the set of resources includes resources linked to by the first network page, where the DNS mapping information includes internet protocol addresses for the set of resources, uniform resource locators for the set of resources, and correlations between the internet protocol addresses and the uniform resource locators;
storing, on the first server computer, the DNS mapping information;

combining, by the first server computer, the first network page and the DNS mapping information for the set of resources in the second domain into a common set of hypertext transfer protocol packet(s), where the DNS mapping information for the set of resources in the second domain is located in header portion(s) of the respective hypertext transfer protocol packet(s); and responsive to receiving a hypertext transfer protocol request for the first network page from a client computer in the first domain, sending, from the first server computer to the client computer, the hypertext transfer protocol packet(s);

wherein the second domain computer is not available for direct data communication with the client computer in the first domain.

2. The method of claim 1 wherein:
the first domain is the World Wide Web;
the network application is a web application; and
the first network page is a web page.

3. The method of claim 1 wherein:
the second domain computer is a domain name system server and is a different computer, with a different second domain address, than the first server computer.

4. The method of claim 1 further comprising the step of:
receiving, by the client computer in the first domain, the first network page and the DNS mapping information; and
resolving, by the client computer, a first host/IP address based, at least in part, upon the DNS mapping information.

5. The method of claim 1 further comprising:
providing router functionality, by the first server computer, for communications between computers in the first domain and computers in the second domain.

6. A computer program product comprising software stored on a software storage device, the software comprising:
first program instructions programmed to connect a first server computer in direct data communication with a first domain and a second domain;
second program instructions programmed to store, on the first server computer, a first network page related to a network application,
third program instructions programmed to receive, from a second domain computer in the second domain, domain name system (DNS) mapping information for a set of resources in the second domain, where the set of resources includes resources linked to by the first network page, where the DNS mapping information includes internet protocol addresses for the set of resources, uniform resource locators for the set of resources, and correlations between the internet protocol addresses and the uniform resource locators;
fourth program instructions programmed to store, on the first server computer, the DNS mapping information;
fifth program instructions programmed to combine, by the first server computer, the first network page and the DNS mapping information for the set of resources in the second domain into a common set of hypertext transfer protocol packet(s), where the DNS mapping information for the set of resources in the second domain is located in header portion(s) of the respective hypertext transfer protocol packet(s); and
sixth program instructions programmed to, responsive to receiving a hypertext transfer protocol request for the first network page from a client computer in the first domain, send, from the first server computer to the client computer, the hypertext transfer protocol packet(s);

wherein:
the software is stored on a software storage device in a manner less transitory than a signal in transit; and
the second domain computer is not available for direct data communication with the client computer in the first domain.

7. The computer program product of claim 6 wherein:
the first domain is the World Wide Web;
the network application is a web application; and
the first network page is a web page.

8. The computer program product of claim 6 wherein:
the second domain computer is a domain name system server and is a different computer, with a different second domain address, than the first server computer.

9. The computer program product of claim 6 further comprising:
sixth program instructions programmed to provide router functionality, by the first server computer, for communications between computers in the first domain and computers in the second domain.

10. A computer system comprising:
a processor(s) set; and
a software storage device;
wherein:
the processor set is structured, located, connected and/or programmed to run software stored on the software storage device; and
the software comprises:
first program instructions programmed to connect a first server computer in direct data communication with a first domain and a second domain;
second program instructions programmed to store, on the first server computer, a first network page related to a network application,
third program instructions programmed to receive, from a second domain computer in the second domain, domain name system (DNS) mapping information for a set of resources in the second domain, where the set of resources includes resources linked to by the first network page, where the DNS mapping information includes internet protocol addresses for the set of resources, uniform resource locators for the set of resources, and correlations between the internet protocol addresses and the uniform resource locators;
fourth program instructions programmed to store, on the first server computer, the DNS mapping information;
fifth program instructions programmed to combine, by the first server computer, the first network page and the DNS mapping information for the set of resources in the second domain into a common set of hypertext transfer protocol packet(s), where the DNS mapping information for the set of resources in the second domain is located in header portion(s) of the respective hypertext transfer protocol packet(s); and
sixth program instructions programmed to, responsive to receiving a hypertext transfer protocol request for the first network page from a client computer in the first domain, send, from the first server computer to the client computer, the hypertext transfer protocol packet(s);
wherein the second domain computer is not available for direct data communication with the client computer in the first domain.

11. The computer system of claim 10 wherein:
the first domain is the World Wide Web;
the network application is a web application; and
the first network page is a web page.

12. The computer system of claim 10 wherein:
the second domain computer is a domain name system server and is a different computer, with a different second domain address, than the first server computer.

13. The computer system of claim 10 further comprising:
sixth program instructions programmed to provide router functionality, by the first server computer, for communications between computers in the first domain and computers in the second domain.

14. The method of claim 1, wherein:
each resource of the set of resource(s) is utilized by the network application.

15. The method of claim 1, further comprising:
accessing, by the client computer, the set of resource(s) based, at least in part, on the DNS mapping information;
wherein by accessing the set of resource(s), the client computer is able to use various types of functionality provided by the web application.

16. The method of claim 1, wherein:
the client computer is an authenticated user of the network application.

17. The method of claim 1, wherein:
the network application includes integrated service management software.

18. The method of claim 17, wherein:
the first network page includes a portal service of the integrated service management software; and
the set of resource(s) in the second domain includes an enterprise management server of the integrated service management software.

19. The method of claim 1, wherein:
the network application includes a distributed log analytics application on a cloud infrastructure;
the first network page includes a TIP server; and
the set of resource(s) in the second domain includes analytic reports and/or graphs.

20. The method of claim 1, wherein:
the first network page includes a dashboard application adapted to make representational state transfer (REST) calls to the set of resource(s) in the second domain.

\* \* \* \* \*